Figures 1, 2:
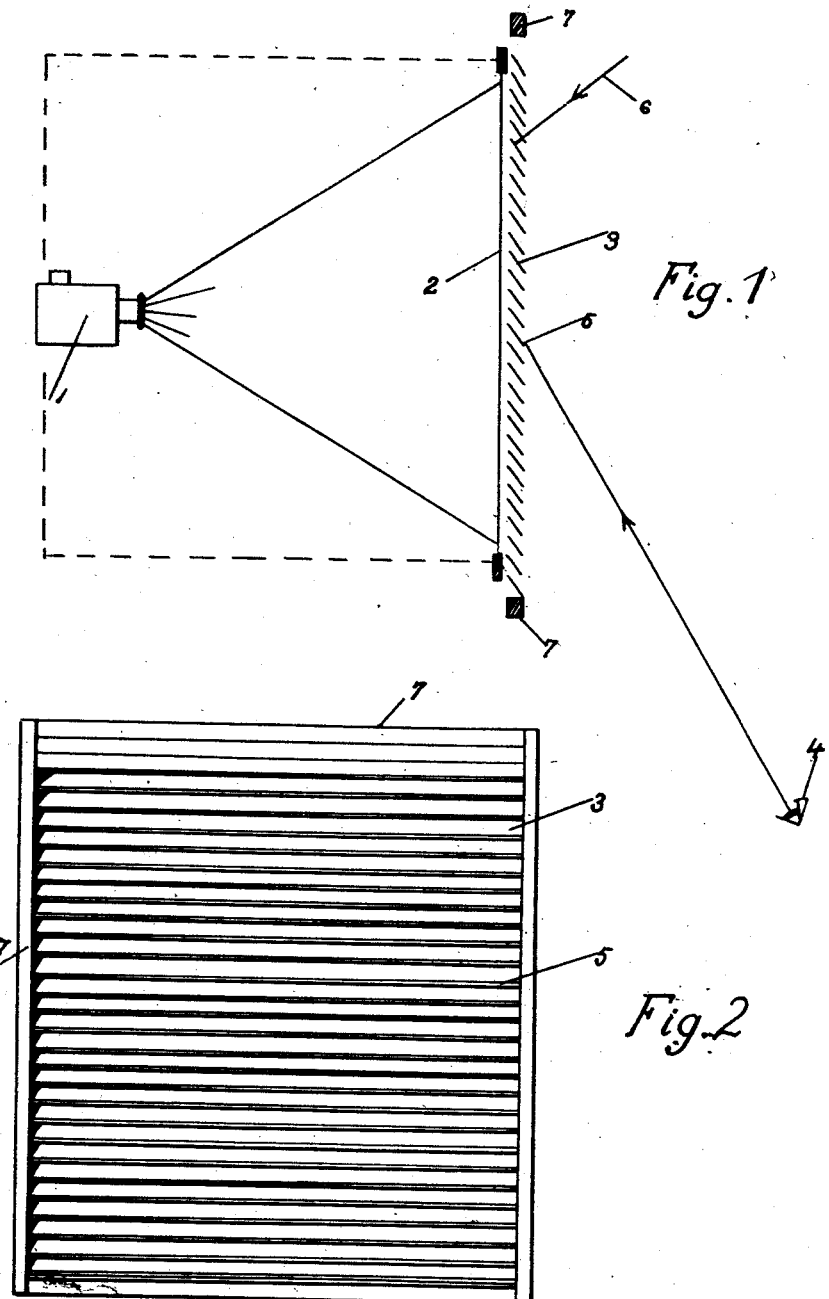

Feb. 10, 1931. C. PAROLINI 1,791,573
DEVICE FOR MAKING LUMINOUS PROJECTIONS IN
BROAD DAYLIGHT OR IN A LIGHTED ROOM
Filed Nov. 1, 1927

Inventor
César Parolini

Patented Feb. 10, 1931

1,791,573

UNITED STATES PATENT OFFICE

CÉSAR PAROLINI, OF LE VESINET, FRANCE

DEVICE FOR MAKING LUMINOUS PROJECTIONS IN BROAD DAYLIGHT OR IN A LIGHTED ROOM

Application filed November 1, 1927, Serial No. 230,368, and in France November 18, 1926.

The present invention has for its subject a device enabling lantern slide or moving picture luminous projections to be carried out in broad daylight or in a lighted room. This device, the use of which is of particular interest in open air luminous advertising, is chiefly characterized by its very simple construction and its low cost of production and by the fact that it enables existing installations to be rapidly and cheaply transformed with a view to adapting them for use for this type of projection.

This device is characterized by the feature that it comprises in combination with a translucent screen for projections by transparency, an arrangement of plates or the like mounted, after the manner of the laths of a Venetian blind, in a frame carriage or the equivalent and arranged obliquely relatively to the surface of the screen, with a constant or varying inclination between one blade and the next so that the spectators will as far as possible see only the front edges of the blades and will be able to see the projections through the spaces between the blades or laths since the whole of the shadows carried by the set of blades put the whole of the surface of the screen into shadow.

In order to make the invention clearly understood and by way of constructional example, an embodiment is hereinafter described and is illustrated diagrammatically in the drawings accompanying the present specification.

In the drawings:—

Fig. 1 is a diagrammatical arrangement in vertical section of a screen arrangement and Fig. 2 is a front view thereof in elevation.

In these figures, 1 is the projecting apparatus and 2 a translucent screen the back face of which is protected from all lighting other than that from the luminous projecting beam, the projecting apparatus 1 being, for this purpose, placed for example, in a dark chamber or the equivalent terminating in the screen.

According to the invention there is arranged in front of the screen 2 a set of blades or laths 3 which are inclined relatively to the surface of the screens 2, which inclination may be the same for all the blades or vary from one blade to the next. In the example illustrated the blades are arranged with a constant inclination, parallel with each other, after the manner of the laths of a Venetian blind so that a spectator whose eye is situated at 4 will see the largest number of blades 3 by their front edge 5 only, and that the whole of the screen 2 will be seen by him through the spaces between the said laths, screened only by a series of lines corresponding to the edges 5 which do not prevent the general visibility of the projection.

By means of this arrangement of blades 3, which may, in certain cases, be perpendicular to the screen, the luminous rays 6 (rays of the sun or other rays) produce a series of shadows upon the blades 3 so that the whole of these shadows put into shadow the whole surface of the screen 2, the result of which is that there is thus obtained, by contrast, the luminosity necessary for a good projection.

The set of blades 3 is mounted, for example, in a frame or carriage 7, after the manner of the laths of a Venetian blind, which frame 7 may be rigid with the frame of the screen 2 or disposed in front of the latter in a removable manner.

It is clearly understood that it is possible, without going outside the scope of the invention, to make modifications and improvements in the details and, for example, this device may also be employed for projections by reflection from an opaque screen, that is, in which the lantern is on the same side of the screen as the spectator.

What I claim is:

A cover for a projection screen one side of which is to be exhibited in daylight formed of a plurality of spaced opaque slats with their longitudinal axes substantially parallel and spaced slightly from and their broad surfaces at an angle to the plane of the face of the screen and means for holding the slats in position, the spacing of the slats and their angle to the face of the screen and the dimensions of their broad surfaces being so adjusted one to the other that the face of the screen will be substantially in shadow but substantially all of the screen will be visible to a spectator suitably positioned.

In testimony whereof I affix my signature.

CÉSAR PAROLINI.